United States Patent [19]
Crandall et al.

[11] Patent Number: 5,474,827
[45] Date of Patent: Dec. 12, 1995

[54] RETROREFLECTIVE ARTICLE AND METHOD OF MAKING THE SAME

[75] Inventors: Michael D. Crandall, North Oaks; Allen L. Griggs, St. Paul; Peter M. Olofson, Oakdale; Taun L. McKenzie; Theresa M. Watschke, both of St. Paul, all of Minn.

[73] Assignee: Minnesota Mining and Manufacturing Company, St. Paul, Minn.

[21] Appl. No.: 216,404

[22] Filed: Mar. 23, 1994

[51] Int. Cl.$^6$ ..................................................... G02B 5/128
[52] U.S. Cl. .................... 428/67; 359/536; 359/538; 359/539; 359/540; 359/541; 428/141; 428/143; 428/149; 428/325; 428/349; 428/521; 428/522; 428/523
[58] Field of Search ............................. 428/67, 141, 143, 428/149, 325, 346, 349, 343, 521, 522, 523; 359/536, 538, 539, 541, 540

[56] References Cited

U.S. PATENT DOCUMENTS

| | | | |
|---|---|---|---|
| 3,700,305 | 10/1972 | Bingham | 350/105 |
| 3,715,596 | 2/1973 | DeMent | 250/84 |

(List continued on next page.)

FOREIGN PATENT DOCUMENTS

| | | | |
|---|---|---|---|
| 0200521 | 11/1986 | European Pat. Off. | G02B 5/124 |
| 342035 | 11/1989 | European Pat. Off. | |
| 0389114 | 9/1990 | European Pat. Off. | G02B 5/128 |
| 264864A1 | 2/1989 | Germany. | |
| 71034116 | 10/1971 | Japan. | |
| 75092991 | 7/1975 | Japan. | |
| 75092992 | 7/1975 | Japan. | |
| 56-125461 | 10/1981 | Japan. | |
| 58-127766 | 7/1983 | Japan. | |
| 58-127773 | 7/1983 | Japan. | |
| 86097371 | 5/1986 | Japan. | |
| 1477486 | 6/1977 | United Kingdom. | |

OTHER PUBLICATIONS

Delano et al., *A New Resin For Field Repair*, 13th National SAMPE Tech. Conf. (Oct. 13–15, 1981).

Hering et al., *Fluorescence Spectroscopic Evidence For Surface Complex Formation At The Mineral–Water Interface: Elucidation Of The Mechanism Of Ligand–Promoted Dissolution*, Langmuir, 7, 1567–1570 (1991).

Meera et al., *Novolak Based Adhesives For Metal–Metal Bonding*, J. Indian Chem. Soc., V. LIV, pp. 819–821 (Aug. 1977).

Mikhailova et al., *Verarb. Anwedungstech. Probl. Org. Hoghpolym., Tagungsskr., Technomer '85*, 2, 233–6 C.A. 106:121135p (Publ. 1986).

Osawa and Takeda, "*Chemical Bonding Between An Inhibitor And AL And Its Inhibition*", Tech. U. Ibaragi Res. Matls., v 29 (1981).

NASA, Sci. & Tech. Aerospace Rep., v. 18, No. 18, N90-24441.

Vohwinkel, F., *Kalthärtende Epoxid–Klebstoffe mit erhöhter Temperatur–und Feuchtigkeitsbeständigkeit*, Adhäsion, heft 6, pp. 29–33 (1990).

Abstract of German Democratic Republic 264864A1.
Abstract of Japanese Patent 56-125461.
Abstract of Japanese Patent 58-127766.
Abstract of Japanese Patent 58-127773.

(List continued on next page.)

*Primary Examiner*—Nasser Ahmad
*Attorney, Agent, or Firm*—Gary L. Griswold; Walter N. Kirn; Karl G. Hanson

[57] ABSTRACT

A retroreflective article (100, 200, 300) includes a monolayer of retroreflective elements (120, 220, 320), a binder layer (110, 210, 310), and a compound comprising an aromatic bidentate moiety. The retroreflective elements (120, 220, 320) are partially embedded in the binder layer (110, 210, 310), and the compound is chemically associated with the retroreflective elements (120, 220, 320) to provide extraordinary laundering durability to the retroreflective article (100, 200, 300).

22 Claims, 2 Drawing Sheets

U.S. PATENT DOCUMENTS

| | | | |
|---|---|---|---|
| 3,836,227 | 9/1974 | Holmen et al. | 350/105 |
| 3,934,065 | 1/1976 | Tung | 428/241 |
| 4,150,295 | 4/1979 | Wieder | 250/458 |
| 4,263,345 | 4/1981 | Bingham | 427/163 |
| 4,340,716 | 7/1982 | Hata et al. | 528/100 |
| 4,448,847 | 5/1984 | Bell et al. | 428/413 |
| 4,560,732 | 12/1985 | Kojo et al. | 525/481 |
| 4,582,809 | 4/1986 | Block et al. | 436/527 |
| 4,621,025 | 11/1986 | Smith | 428/414 |
| 4,751,256 | 6/1988 | Patel et al. | 523/412 |
| 4,763,985 | 8/1988 | Bingham | 350/105 |
| 4,937,127 | 6/1990 | Haenggi et al. | 428/148 |
| 4,994,505 | 2/1991 | Gerber | 523/145 |
| 5,055,347 | 10/1991 | Bacon, Jr. | 428/250 |
| 5,127,973 | 7/1992 | Sengupta et al. | 156/60 |
| 5,162,156 | 11/1992 | Troughton, Jr. et al. | 428/460 |
| 5,186,783 | 2/1993 | Kawashima et al. | 156/307.3 |
| 5,200,262 | 4/1993 | Li | 428/266 |
| 5,283,101 | 2/1994 | Li | 428/141 |
| 5,283,148 | 2/1994 | Rao | 430/114 |

OTHER PUBLICATIONS

Aleksandrova et al. *Kompoz. Polim. Mater,* 15,23–7, C.A.99:24065v (1982).

Bell and DeNicola, 182nd National Meeting of the American Chemical Society, *Organic Coatings and Plastics Chemistry Preprints,* 45, 182nd National ACS Meeting, New York City, p. 120 (Aug. 23–28, 1981).

Brockman, *Interface Reactions and Their Influence On The Long–Term Properties Of Metal Bonds,* Adhesives Age, pp. 30–34 (Jun. 1977).

Haubl et al., *Preparation of Cellulose Filters with Covalently Bound Dithiocarbamate, 8–Hydroxyquinoline, and Aminocarboxylic Acid Functional Groups,* Die Angewandte Makromolekulare Chemi, vol. 121, pp. 209–222 (1984).

Vernon et al., *Synthesis Optimization and the Properties of 8–Hydroxyquinoline Ion–Exchange Resins,* Anal. Chim. Acta., vol. 93, pp. 201–210 (1977).

RETROREFLECTIVE ARTICLE AND METHOD OF MAKING THE SAME

TECHNICAL FIELD

The present invention pertains to: (i) a retroreflective article; (ii) wearing apparel that displays a retroreflective article; (iii) a composition useful in a retroreflective article; and (iv) a method of making a retroreflective article.

BACKGROUND OF THE INVENTION

Retroreflective articles have the ability to return a substantial portion of incident light in the direction from which the light originated. This unique ability has led to widespread use of retroreflective articles on clothing. Persons who work or exercise near motor vehicle traffic need to be conspicuously visible so that they do not get struck by passing motor vehicles. Retroreflective articles serve the purpose of highlighting a person's presence by retroreflecting light from motor vehicle headlamps or other light sources.

A retroreflective article typically comprises a layer of optical elements, a polymeric binder layer, and a specular reflective layer. The optical elements usually are transparent microspheres that are partially embedded in the polymeric binder layer such that a substantial portion of each microsphere protrudes from the polymeric binder layer. Typically, the binder layers in such articles are elastomeric compositions of polyacrylates, polyolefins, phenolic cured resins, isocyanate polymers with active hydrogens such as two part urethanes or aminoplast- or amine-cured hydroxy functional polymers. The specular reflective layer typically comprises aluminum or silver, and this reflective layer is disposed beneath the embedded portion of the transparent microspheres. Light striking the front surface of the retroreflective article passes through the transparent microspheres, is reflected by the specular reflective layer, and is collimated by the transparent microspheres to travel back in the direction of the light source.

Retroreflective articles must be able to withstand laundering conditions when used on clothing. If the retroreflective article is not durable to laundering, and retroreflectivity becomes substantially diminished after repeated washings, the clothing cannot continue to serve its safety function by highlighting the wearer's presence. Investigators in the retroreflective article an have pursued an ongoing goal of developing launderably-durable retroreflective articles so that persons wearing retroreflective clothing can continue to be conspicuously visible after the clothing has been worn and cleaned many times.

In U.S. Pat. No. 4,763,985 to Bingham, a launderable retroreflective article is disclosed that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material.

In U.S. Pat. No. 5,200,262 to Li, a launderable retroreflective article is disclosed that comprises a monolayer of metal-coated microspheres partially embedded in and partially protruding from a binder layer that comprises a flexible polymer having hydrogen functionalities and one or more isocyanate-functional silane coupling agents. The disclosed flexible polymers that possess hydrogen functionalities are crosslinked, flexible urethane-based polymers such as isocyanate-cured polymers or one or two component polyurethanes and polyols. This retroreflective article provides good laundering durability: it can withstand industrial laundering conditions, which involve wash temperatures as high as 40° to 90° C. (105° to 190° F.) and pH values of 10 to 12.5.

In U.S. Pat. No. 5,283,101 to Li, a launderable retroreflective article is disclosed that comprises a binder layer formed from an electron-beam curable polymer and typically one or more crosslinkers and silane coupling agents. The electron-beam curable polymers include chlorosulfonated polyethylenes, ethylene copolymers comprising at least about 70 weight percent of polyethylene such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. This retroreflective article also has been shown to be durable under industrial laundering conditions.

SUMMARY OF THE INVENTION

The present invention provides a new and improved retroreflective article which, in brief summary, includes a compound, a monolayer of optical elements, a binder layer having first and second major surfaces, and a reflective metal disposed at least beneath the optical elements. The optical elements are at least partially embedded in the binder layer. The binder layer may be composed of a polymeric substance, and the disposition of the specularly reflective metal may be any of: (a) a coating on or functionally adjacent to at least the embedded portion of the optical elements, (b) a coating over the first surface of the binder layer including the surface underneath the optical elements, or (c) a particulate metal such as flakes dispersed within the binder layer such that at least a portion of the particulate is functionally adjacent to the optical elements so that this portion of the particulate will reflect light passing through the optical elements.

The compound has an organic or organometallic nature, and it has at least a first constituent that chemically associates with the specularly reflective metal. To chemically associate with the specularly reflective metal, the compound may be disposed in any of several arrangements. It may be disposed proximate to the first surface of the binder layer; it may be combined with the binder layer; or it may be both combined with the binder layer and disposed proximate to the first surface of the binder layer. The proximate relationship described for several of these arrangements means that the compound is disposed either on top of or underneath the specularly reflective metal.

Two structural versions of the compound can be used according to the invention. In the first structural version, the compound has the first constituent alone. The first constituent may be an aromatic bidentate moiety. The bidentate portion of this moiety may be dihydroxy or hydroxy and aromatic nitrogen. Other substituents also may be present on the compound.

In the second structural version, the compound has first and second constituents. The function and structure of the first constituent is as described above. The function of the second constituent enables the compound to be solubilized in or be covalently bound to the binder layer. Structurally, the second constituent can be a non-reactive alkyl or aromatic group or a reactive group such as a hydroxy, amine, isocyanate, epoxy, carboxy, vinyl, mercapto or activated acyl group. Preferably, when the second constituent is a reactive group, it also includes a $C_0$ to $C_8$ alkylene group.

The present invention also includes an article of wearing apparel sized and configured to be worn or carried by a person. The article of wearing apparel is a combination of the retroreflective article and a substrate which forms part of the outer portion of the wearing apparel. The substrate may be a web of leather, fabric, plastic, mesh, a netting, a foam, a woven, knitted or non-woven material. The retroreflective article can be attached to the substrate by an adhesive bond, by sewing, by riveting, or by any other suitable technique.

The present invention also provides a composition that includes a polymer, the second structural version of the compound, and the specularly reflective metal. The second constituent of the compound is solubilized by or covalently bonded to the polymer while the first constituent is chemically associated with the metal.

The present invention also provides a method of making a retroreflective article which includes forming a monolayer of retroreflective elements and the steps, in any order including simultaneously, of forming a binder layer over the monolayer of retroreflective elements and contacting the compound and the specularly reflective metal of the retroreflective elements to form the article.

The retroreflective article and wearing apparel of the invention have been found to exhibit surprising retention of retroreflective brightness after being repeatedly laundered. This advantageous result is believed to be achieved through increased resistance to loss of retroreflective elements and increased resistance to degradation of the specularly reflective metal of the retroreflective elements. Consequently, the article and wearing apparel of the invention may be cleaned more times than previously thought possible while still retaining the desired retroreflective character.

The surprising retention of retroreflective brightness by the article and wearing apparel of the invention is provided by the composition and method of the invention and is believed to be the result of physical and/or chemical protection of the specularly reflective metal of the retroreflective elements. Although it is not meant to be a limitation of the invention, it is believed that the compound provides this protection. The compound is thought to be coordinatively complexed with the specularly reflective metal so that chemical or environmental attack upon the metal is rendered substantially ineffective. When used, the second constituent of the compound is also thought to further promote protection by establishing a link to the binder layer. It is believed that the metal complexation relationship is primarily achieved through the formation of a 5 or 6 membered ring planar coordination complex between the aromatic bidentate moiety and the metal. It is also believed that the linking relationship is primarily achieved through metal complexation and solubilization with, or covalent bonding to, the polymeric substance.

When used as overcoatings on top of the specularly reflective metal, the first and second structural versions of the compound are believed to provide resistance to attack upon the specularly reflective metal exposed upon the first surface of the binder layer through the function of the compound as an insulator over that exposed metal. When used under the specularly reflective metal or when combined with the binder layer, the second structural version of the compound is believed to provide resistance to attack upon the specularly reflective metal through the function of the compound as a binding link between the specularly reflective metal and the binder layer. It is believed that these functions of the compound at least in part cause the increased resistance to loss of retroreflective elements and increased resistance to degradation of the reflector metal of the retroreflective elements when the article or wearing apparel of the invention is cleaned.

The above and other advantages of the invention are more fully shown and described in the drawings and detailed description of this invention, where like reference numerals are used to represent similar parts. It is to be understood, however, that the description and drawings are for the purposes of illustration and should not be read in a manner that would unduly limit the scope of this invention.

DETAILED DESCRIPTION OF THE INVENTION

Figure 1:
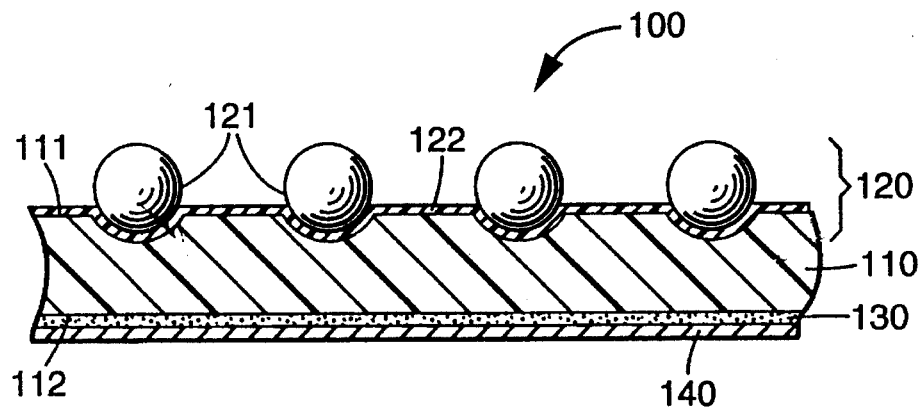
FIG. 1 is a cross-sectional view of a retroreflective article 100 using the second structural version of the compound in accordance with the present invention.

In describing preferred embodiments of the invention, specific terminology is used for the sake of clarity. The invention, however, is not intended to be limited to the specific terms so selected, and it is to be understood that each term so selected includes all technical equivalents that operate similarly.

The retroreflective article of the invention includes a monolayer of retroreflective elements (optical elements and specularly reflective metal) at least partially embedded in a binder layer composed of a polymeric substance, and a compound incorporated into the binder layer and/or disposed proximate to the surface of the binder layer. The compound is at least chemically associated with the specularly reflective metal of the retroreflective elements and also may be physically or chemically associated with the binder layer. For the purposes of the invention, the term "chemically associated" in the context of the compound and the specularly reflective metal means that the compound interacts with the metal so that the metal is rendered resistant to dissolution or degradation by environmental or chemical agents. For the purposes of the invention, the term "physically associated" in the context of the compound and the binder layer means that the compound interacts with substances in the binder layer by hydrogen bonding, van der Waals forces or lipophilic attraction so that the compound and binder layer are solubilized together. For the purposes of the invention, the term "chemically associated" in the context of the compound and the binder layer means that the compound covalently bonds to substances in the binder layer so that the compound and binder layer are bonded together.

The arrangements possible for the compound, binder layer and specularly reflective metal include: (a) compound dispersed in the binder layer; (b) compound concentrated at the first surface of the binder layer or separately coated between the binder layer and metal; (c) compound coated directly on top of the metal with the metal overlaid directly on the binder layer; and (d) any combination of these arrangements including a+b, a+c, b+c, and a+b+c.

The first and second structural versions of the compound are organic or organometallic compounds with a first constituent, and with first and second constituents, respectively. It is believed that essentially all compounds possessing the herein-characterized aromatic bidentate moiety may be used as the compound in this invention.

The first structural version of the compound is capable of chemically associating with the specularly reflective metal. This version of the compound can be used only when the compound is overlaid on the specularly reflective metal overlaying the binder layer. Generally, this version of the compound is used at about $2.0 \times 10^{-5}$ grams per square centimeter (g/cm$^2$) to about $1.0 = \times 10^{-3}$ g per sq cm of surface covered. Usually a coating thickness is less than about 1 micrometer and is at least a monomolecular layer.

The second structural version of the compound is capable of chemically associating with the specularly reflective metal and also of physically or chemically associating with the binder layer. This version of the compound can be used with all arrangements of the binding layer, compound, and specularly reflective metal. Generally, this version of the compound is used at about 0.1 to about 10 weight percent of the polymeric substance present in the binder layer.

The first constituent of the compound includes an aromatic bidentate moiety that is believed to be capable of forming a planar coordination 5 or 6 membered ring complex with the specularly reflective metal. The bidentate portion of that moiety may be dihydroxyl or a hydroxyl and an aromatic nitrogen group. Additional functional groups may also be present but are not necessary. In a preferred version, the first constituent may have the formula

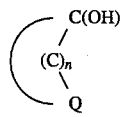

wherein the overall formula represents one or more substituted or unsubstituted aromatic ring(s), Q is COH or N, and n is 1 or 0, with the proviso that when Q is N, n is 1.

The second constituent of the compound is selected to have a functionality that is compatible with the nature of the binder layer or with a reactive group of the binder layer. In this fashion, the second constituent and the binder layer are believed to be capable of entering into a physical association such as solubilization or a chemical association such as a covalent bonding reaction. For physical association, the second constituent is preferably a $C_5$ to $C_{20}$ aliphatic group or a $C_6$ to $C_{20}$ aromatic group. For covalent bonding, the second constituent preferably is a hydroxy, amine, isocyanate, carboxy, epoxy, vinyl, mercapto, or activated acyl group or is a $C_1$ to $C_8$ alkylene or a $C_6$ to $C_{20}$ aromatic group also substituted by at least one of these groups.

Preferably, the first structural version of the compound may be 8-hydroxyquinoline, 1,2-dihydroxybenzene or 1,8-dihydroxynaphthalene. Also, preferred are substituted forms of these named compounds and derivatives of these named compounds in which the named aromatic ring is incorporated into a larger formula or fused into a larger ring structure. Other examples include dihydroxy toluene, nitrocatechol, 2,3-dihydroxy pyridine, dihydroxylbenzaldehyde, 3,3',4,4'-tetrahydroxybenzophenone, 1,2-dihydroxybiphenyl, and pyrogallol.

Preferably, the second version of the compound may be a catechol novolak resin, or may be an 8-hydroxyquinoline having a second constituent, a 1,2-dihydroxy benzene having a second constituent, or a 1,8-dihydroxynaphthalene having a second constituent. Of these compounds, 5-amino-8-hydroxyquinoline is especially preferred. Also preferred are substituted forms of these named compounds and derivatives of these named compounds in which the named aromatic ring is incorporated into a larger formula or fused into a larger ring structure. Other examples include dithranol (1,8,9-trihydroxy anthracene), 3,4-dihydroxybenzyl-2-hydroxyethylimine, 3,4-dihydroxycafeic acid and its 2-hydroxyethyl ester, nordihydroguaiaretic acid, gallic acid, tannic acid, n-dodecyl gallate, and quinalizarin (1,2,5,8-tetrahydroxyanthraquinone).

The binder layer generally is a polymeric substance. The binder layer also may contain such optional additives as colorants (for example, pigments and dyes) and stabilizers (for example, thermal and hydrolytic stabilizers and antioxidants, flame retardants, and flow modifiers (for example, surfactants), viscosity adjusters (for example, organic solvents), rheology modifiers (for example, thickeners), and coalescing agents, plasticizers, tackifiers, and the like. Generally, the binder layer contains from about 70 percent by weight up to about 100 percent by weight polymeric substance with the remainder being optional additives in effective amounts and the compound under those circumstances described above.

The polymeric substance of the binder layer may be a flexible polymer including but not limited to an elastomer. For the purposes of the invention, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). Preferably, the polymeric substance includes a crosslinked or virtually cross-linked elastomer. For the purposes of the invention, a cross-linked elastomer means that the polymeric chains of the elastomer are chemically cross-linked to form a three dimensional network which is stabilized against molecular flow. For the purposes of the invention, a virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed in the binder layer include: polyolefins; polyesters; polyurethanes; polyepoxides; and natural and synthetic rubbers. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers. Examples of cross-linkers are provided in U.S. Pat. No. 5,283,101, the disclosure of which is incorporated here by reference.

The binder layer typically has a thickness of about 50 to 250 micrometers (2 to 10 mils), with thicknesses of about 75 to 200 micrometers (3 to 8 mils) often being preferred. It is to be understood that a binder layer having a thickness outside these ranges may be used; however, if the binder layer is too thin, it may not provide sufficient support to the retroreflective elements and the elements may become dislodged.

Supported by the binder layer are retroreflective elements that include optical elements capable of collimating light so that, in conjunction with the reflective metal, incoming light can be retroreflected. The optical elements can be spherical, transparent microspheres and can have a specularly reflective metal on or adjacent to the embedded portions thereof. Examples of such specularly reflective metal arrangements include a coating of metal on the optical elements, a coating of metal on the binder layer underneath the optical elements, and a dispersion of metal flakes or a layer of metal (e.g., metal film) within the binder layer with at least a portion being adjacent to the optical elements so that this portion will reflect light passing through the optical elements. Such retroreflective elements typically provide satisfactory levels of retroreflective brightness over a wide range of incidence angles; that is, the angles at which the light strikes the sheeting, a property sometimes referred to as "angularity".

When transparent microspheres are used as optical elements, the microspheres preferably are substantially spherical in shape to provide the most uniform and efficient retroreflection. The microspheres preferably are substantially transparent to minimize the amount of light absorbed by the microspheres and thereby optimize the amount of light which is retroreflected by an article of the invention. The microspheres typically are substantially colorless, but may be colored to produce special effects.

Transparent microspheres may be made from glass or synthetic resin which possesses the required optical properties and physical characteristics needed for retroreflection. Glass microspheres typically are preferred because they can be harder and more durable than microspheres made of synthetic resins.

Microspheres used in the present invention typically have an average diameter within the range of about 30 to 200 micrometers. Microspheres smaller than 30 micrometers may tend to provide lower levels of retroreflection because of diffraction effects; whereas, microspheres larger than 200 micrometers may tend to impart undesirably rough texture to the article or undesirably reduce the flexibility thereof. Microspheres used in this invention typically have a refractive index within the range of about 1.7 to about 2.0.

A variety of metals may be used as a specularly reflective metal. These include aluminum, silver, chromium, nickel, magnesium and the like. The metal may be a continuous coating such as is produced by vacuum-deposition, vapor-coating, chemical-deposition as a metal coating, or may be used in the form of metal flakes. It is to be understood that in the case of aluminum, at least part but not all of the metal may be in the form of the metal oxide and/or hydroxide. Aluminum and silver metals are preferred because they tend to provide the highest retroreflective brightness. The metal layer should be thick enough to reflect, typically at least about 500 angstroms. Although the reflective color of a silver coating can be brighter than an aluminum coating, an aluminum vapor coat often is preferred because a silver coating may degrade to a larger extent when exposed to the environment.

Figure 2:
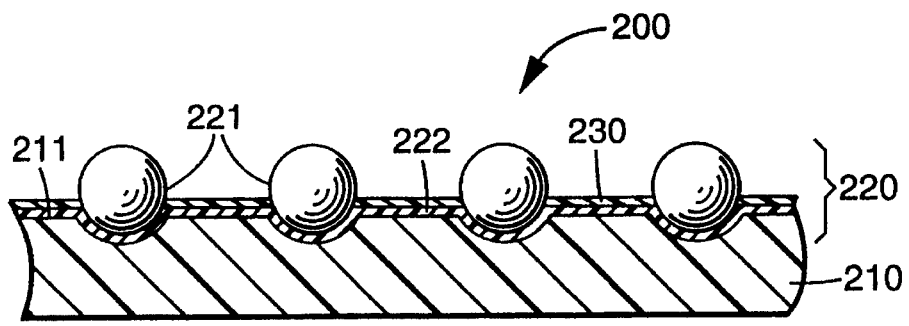
FIG. 2 is a cross-sectional view of retroreflective article 200 using the first structural version of the compound in accordance with the present invention.

Particular embodiments of retroreflective articles of the invention are illustrated in FIGS. 1 and 2.

FIG. 1 shows retroreflective article 100 of the invention in which the compound is incorporated into the binder layer. Article 100 includes binder layer 110 and monolayer of partially embedded retroreflective elements 120. Retroreflective elements 120 with microspheres 121 and specularly reflective metal 122 are disposed on a first major surface 111 of binder layer 110. The compound is dispersed throughout binder layer 110. At the first major surface 111, it is believed that the compound links specularly reflective metal 122 to binder layer 110. Disposed on a second major surface 112 of binder layer 110 is an optional adhesive layer 130 and optional release liner 140 that covers the exposed surface of adhesive layer 130.

FIG. 2 shows retroreflective article 200 of the invention in which the compound is a coating 230 overlaid on top of the specularly reflective metal 222. Article 200 includes binder layer 210, a monolayer of partially embedded retroreflective elements 220 with microspheres 221 and specularly reflective metal 222. Specularly reflective metal 222 may coat a first major surface 211 of binder layer 210. A coating of the compound is overlaid on the specularly reflective metal 222 so as to form a top surface coating 230 on article 200.

Figure 3A:
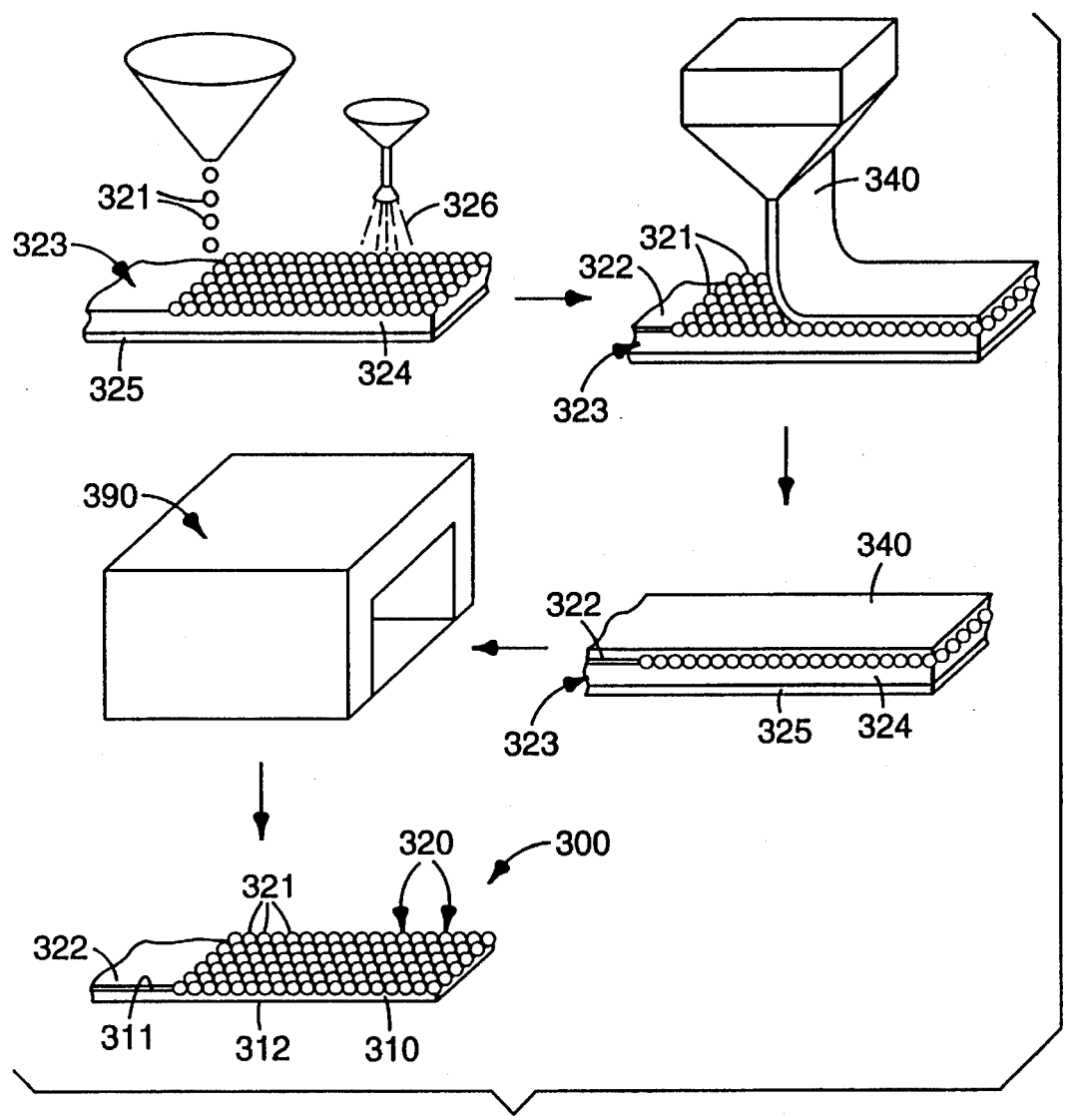
FIG. 3A is a schematic representation of the manufacture of a version of the retroreflective article 300 in accordance with the present invention.
Figure 3B:
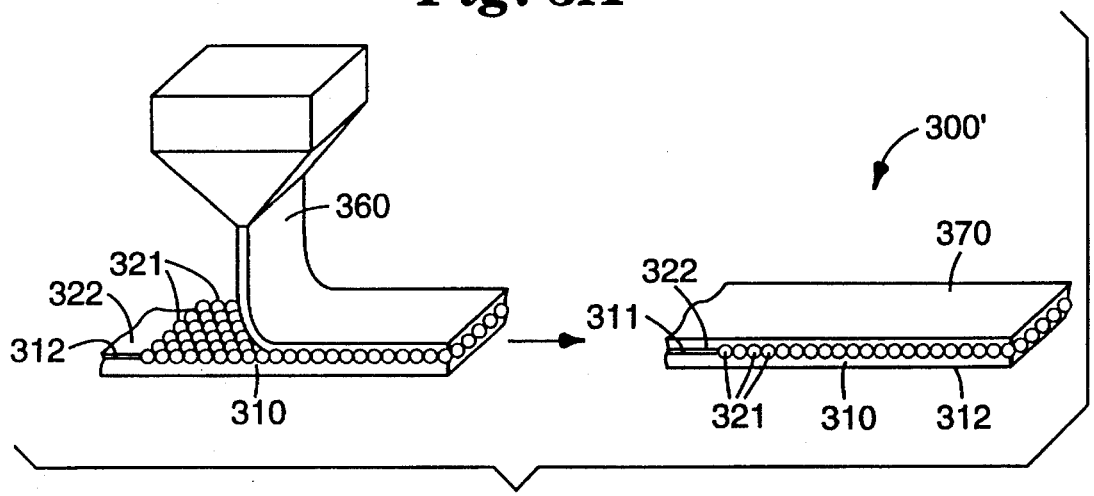
FIG. 3B is a schematic representation of the manufacture of another version of the retroreflective article 300' in accordance with the present invention.

The retroreflective article of the invention generally follows a sequential formation technique involving the stepwise construction of the various layers. More specifically, the steps include forming the monolayer of retroreflective elements and forming the binder layer as an overlay on the monolayer. A schematic illustration of a method of preparing a retroreflective article 300 of the invention is shown in FIGS. 3A and 3B. As shown in FIG. 3A, a monolayer of the retroreflective elements may be assembled by cascading transparent microspheres 321 onto a carrier layer 323 which secures the microspheres 321 in a desired temporary arrangement. Microspheres 321 preferably are packed as closely as possible, ideally in their closest hexagonal arrangement, to achieve very good retroreflective brightness and may be so arranged by any convenient application process, such as printing, screening, cascading, or hot rolling. For instance, microspheres 321 can be partially embedded in a carrier layer composed of a heat softened polymer lining 324 on paper sheet 325. Some examples of useful polymers for polymer lining 324 include polyvinyl chloride, polysulfones, polyalkylenes such as polyethylene, polypropylene, and polybutylene, polyesters such as polyethylene terephthalate, and the like.

Upon cooling, polymer lining 324 retains the microspheres 321 in a desired arrangement. A specularly reflective metal 326 then is applied to the carrier layer 323 with microspheres 321 so that the exposed portions of the microspheres 321 as well as the exposed carrier layer become coated with a specularly reflective metal layer 322. This technique facilitates the arrangement of the retroreflective elements 320 in substantially uniform direction for retroreflection. Furthermore, the size of reflectors 320, as indicated by the surface portion of the microspheres 321 covered with the specularly reflective metal 322, may be controlled in part by controlling the depth to which the microspheres 321 are embedded in the carrier 323 prior to application of the specularly reflective metal layer 326.

As further shown in FIG. 3A, following formation of the specularly reflective metal layer 322, a layer of prebinder composition 340 is applied onto the specularly reflective metal layer 322 to form binder layer 310. To form the retroreflective article with the compound incorporated into the binder layer 310, the prebinder composition 340 is composed at least of the polymeric substance and the second structural version of the compound.

The prebinder composition 340 and the binder layer 310 may contain up to about 10 percent of the compound, and preferably at from about 0.1 to 5 percent based on weight of the solids in the prebinder composition 340 or binder layer 310. The polymeric substance preferably is present in prebinder composition 340 and the binder layer 310 up to about 99.9 weight percent, preferably at from 70 to 99.5 weight percent, based on weight of solids in the prebinder composition or binder layer. To form the prebinder composition, the compound is mixed or otherwise combined with the polymeric substance and an optional solvent. The optional organic solvent may be an aprotic polar volatile organic solvent. Examples include chloroform, tetrahydrofuran, methyl ethyl ketone, toluene, ethylene chloride, and methylene chloride. These prebinder compositions can contain up to 75 weight percent solids and as little as 10 weight percent solids, with the remainder being solvent.

The prebinder composition 340 is converted to the binder layer 310 under conditions (such as heat in oven 390 as shown in FIG. 3A) which allows the polymeric substance to harden, set, cross-link or otherwise transform, and allows the compound to solubilize in or covalently bond to the polymeric substance and to chemically associate with metal layer 322. The conversion of prebinder composition 340 to binder layer 310 may be accomplished by one or more of the following techniques: thermal setting, free radical initiating, condensation, addition and other bonding/complexing techniques. Conversion of prebinder composition 340 and removal of carrier layer 323 complete the formation of article 300.

A typical method for making an article of the invention with the compound as a coating overlay follows the foregoing method. As shown in FIG. 3B, following formation the monolayer of microspheres 321 and specularly reflective metal layer 322 on binder layer 310 (minus the compound) and removal of carrier layer 323, the first surface 311 of binder layer 310 is contacted with a solution 360 containing the first structural version of the compound. For example, the first structural version of the compound optionally dissolved in a volatile organic solvent can be applied to the binder layer by spraying, painting, coating or other physical manipulation known to be capable of overlaying a solid surface with another material. This step places the compound in contact with any specularly reflective metal exposed on the first surface of the binder layer. In this fashion, the compound forms protective barrier 370, preferably a film, on the resulting retroreflective article 300' between the specularly reflective metal layer 322 and the environment.

For all versions of the article of the invention an optional substrate (not shown) such as a netting, webbing, fabric or other strengthening material can be added to the second side 312 of binder layer 310 by physical attachment, by adhering through a hot melt adhesive or a pressure sensitive adhesive, or by enmeshing into the binder layer through incorporation of the flexible substrate into the prebinder composition as it hardens or otherwise sets. Also for all versions of the article of the invention, an optional adhesive layer (not shown) can be applied to the second side 312 of binder layer 310. The adhesive may be applied by methods known in the art. Adhesive compositions useful for this purpose are generally known and include hot melt adhesive, pressure sensitive adhesive, or curable adhesive. A removable release liner may be disposed over the adhesive until the article is adhered to a substrate.

Figure 4:
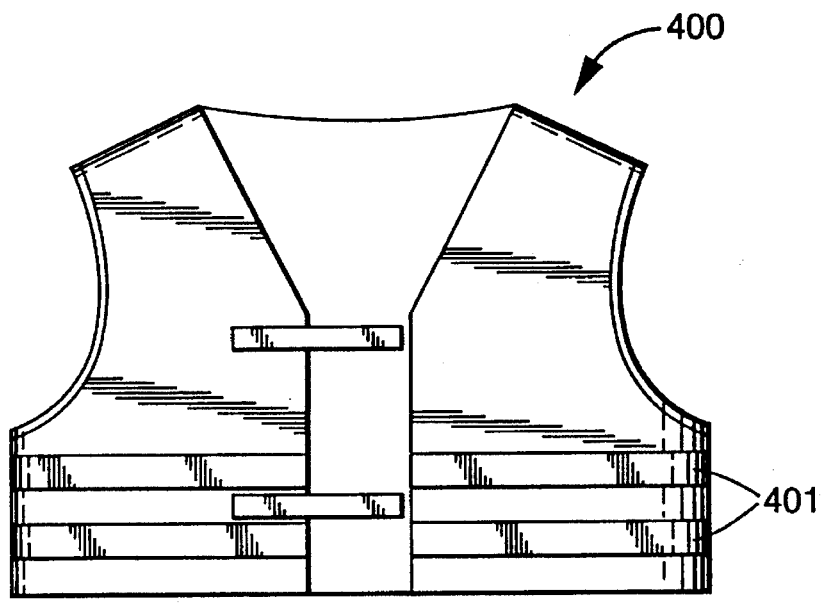
FIG. 4 illustrates an article of wearing apparel in accordance with the present invention.

FIG. 4 illustrates an example of an article of wearing apparel, a safety vest 400 displaying a retroreflective article 401. Although safety vest 400 has been chosen for illustration, the wearing apparel of the invention may be essentially any launderable article sized and configured to be worn or carded by a person and displaying a retroreflective article on the outer surface thereof. Other examples of articles of wearing apparel that may display retroreflective articles according to the invention include shirts, sweaters, jackets, coats, pants, shoes, socks, gloves, belts, hats, suits, one-piece body garment, bags, backpacks, helmets, et cetera.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

EXAMPLES

Unless otherwise indicated, the following test methods were used.

Retroreflective Brightness Test

Retroreflective brightness was measured using a retroluminometer as described in U.S. defensive publication T987,003 at divergence angles of about 0.2° and entrance angles of about −4°. The retroreflective brightness of the middle of each sample was determined periodically. The results are expressed below as the percentage of initial retroreflective brightness.

Industrial Wash Test

Launderability of articles was evaluated by washing a piece of fabric to which the subject article had been applied for the indicated number of cycles in a Milnor System 7 Washing Machine Model 30015M4G from Pellerin Milnor Corp. using program no. 7 for heavily soiled, colored fabric with the detergent designated below. Each cycle was about 1 hour in length. The washer was loaded with enough pieces (approximately 80) of fabric (about 45 centimeters (cm) by 75 cm) to make a 28 lb load including from one to four pieces of fabric having several (typically about 5) retroreflective articles of the invention about 5 by 15 centimeters in size sewn or bonded thereto. The washer used about 68 liters (18 gallons) of water at 74° C. (166° F.). Unless otherwise indicated, the cleaning agents used were 30 grams of FACTOR™ detergent (from Diversey Fabrilife Chemicals, Inc., Cincinnati, Ohio) containing tetrasodium pyrophosphate, nonylphenoxypoly(ethyleneoxy)ethanol, sodium carbonate, and silica, and 60 grams of ORTHOSIL™(a pH builder from Elf Atochem North America, Philadelphia, Pa., believed to contain 40 weight percent NaOH and 60 weight percent sodium metasilicates). The retroreflective brightness of the middle of each sample was determined periodically. The results are expressed below as the percentage of its initial retroreflective brightness the sample retained after the indicated number of wash cycles.

PREPARATIONS

The following preparations provide the starting materials for Examples 1,2,3,4,5, and 6.

Preparation 1

Preparation of 5-Amino-8-Hydroxyquinoline

5-Amino-8-hydroxyquinoline was prepared by the reduction of 8-hydroxy-5-nitroquinoline (from Aldrich Chemical Co., Inc., Milwaukee, Wis.). Twenty-five grams (0.131 moles) of 8-hydroxy-5-nitroquinoline were placed in a 500 milliliter (ml) Parr bottle followed by 250 ml of glacial acetic acid and 1 g of 10% palladium carbon. The bottle was further filled with $3 \times 10^5$ Pascals (Pa) (3 atmospheres) of hydrogen. The filled bottle was attached to the Parr shaker-type hydrogenation apparatus (from Parr Instrument Co., Moline, Ill.) and the bottle and its contents were shaken until theoretical uptake was complete (approximately 5–6 hours). Reduction of the nitro group to the amine group was verified by the theoretical uptake of hydrogen. The original pressure in the Parr reactor was 0.61 MPa (88 psi). A drop of 0.24 MPa (34.7 psi) indicated that the theoretical uptake of hydrogen had occurred. The reaction contents were filtered, and the liquors were concentrated to a black-purple tar using a rotoevaporator. To remove excess acetic acid from the 5-amino-8-hydroxyquinoline, the tar was spread onto the bottom of an aluminum pan. The pan and its contents were heated in a vacuum oven for about 16 hours until the contents (5-amino-8-hydroxyquinoline) were dry.

Preparation 2

Preparation of Catechol/Formaldehyde Novolak Resins

Catechol (440.0 grams (4.0 moles) from James River Corp., Camas, Wash.) and 162 grams of 37% aqueous formaldehyde (2.0 moles) were placed into a one-liter, three-necked, round-bottomed flask equipped with a paddle stirrer, thermometer, water-cooled condenser and heating mantle. Deionized water (400 milliliters) was added to the flask and stirring was started. The mixture was heated to 50° C., 75° C., 85° C., and finally to reflux temperature (approximately 100° C.) over a 15 minute interval. Refluxing continued for two hours, then the solution was cooled to about 60° C. Oxalic acid (4 grams; 0.044 moles) was added, and the temperature was raised to reflux temperature over a 30 minute interval. Refluxing continued for an additional two hours. At the end of this time, 50 millimeters Hg vacuum was applied. The pressure was gradually lowered to less than or equal to 0.8 millimeters Hg vacuum, and the temperature of the mixture allowed to rise to between 150° C. and 160° C. The mixture was maintained at this temperature and vacuum for 30 minutes. The vacuum and heat were removed. The contents were poured into an aluminum pan and allowed to cool to room temperature. After cooling, a reddish solid formed which was broken into small pieces and stored in an air-tight container. The yield was approximately 450 grams. Fourier transform infrared spectroscopy revealed a characteristic phenol hydroxyl group at 3375 cm$^{-1}$, and other characteristic bands at 1515, 1282, 1258 and 1190 cm$^{-1}$.

Preparation 3

Preparation of 5-hydroxymethyl-8-hydroxyquinoline

In a one-liter three-necked round-bottomed flask equipped with a mechanical stirrer, thermometer, HCl inlet tube, and an outlet tube to an aqueous base trap, 101.5 grams (0.7 moles) of 8-hydroxyquinoline (from Aldrich Chemical Co., Inc., Milwaukee, Wis.), and 250 ml (9.75 moles) concentrated HCl were stirred. An amber solution which warmed to 35° C. was produced. Formalin (250 ml; 3.3 moles) was added to the solution. This addition did not change the color or temperature of the solution. The solution was cooled to 20° C. using a water and ice bath, and HCl gas was bubbled in to the solution for 5.5 hours. The temperature gradually increased to 32° C. After 4.5 hours, a yellow precipitate began to form. The mixture was allowed to stand overnight before it was filtered, and the precipitate washed with ether. The precipitate was dried at 49° C. (120° F.) overnight in a vacuum oven in the presence of KOH and CaCl$_2$. A bright yellow solid, 5-chloromethyl-8-hydroxyquinoline hydrochloride, (141.7 grams; 88% yield) was left after drying.

In a 500 ml Ehrlenmeyer flask with a magnetic stirrer, 23 grams (0.1 moles) of 5-chloromethyl-8-hydroxyquinoline hydrochloride and 200 ml of H$_2$O were stirred, producing a bright yellow solution. NH$_4$OH (7.0 grams; 0.2 moles) in concentrated form was added slowly. The color of the solution changed to amber. As the pH approached neutral, the color disappeared, and a precipitate formed. The precipitate was filtered, washed with water, and oven dried at 105° C. After drying, 15.2 grams (87% yield) of product was left.

Differential Scanning Calorimetry (DSC) at a rate of 1° C. per minute showed a melting point of 134° C. compared to the literature value of 138°–9° C. The crude product was recrystallized from 75 ml of toluene, yielding 10.0 grams of a buff solid with a melting point of 138°–9° C. which was determined using DSC at a rate of 2° C. per minute.

Example 1

Glass microspheres having an average diameter of 40 to 90 micrometers were partially embedded into a carrier web of polyethylene coated paper and aluminum specular reflective layers were applied to the exposed portions of the microspheres to yield retroreflective elements.

A prebinder composition was formulated as follows.

| Amount (parts) | Component |
|---|---|
| 100.0 | Binder Material - 50 weight percent solids solution in methyl ethyl ketone/toluene (1:1 weight ratio) of VITEL ™ 3550, a linear saturated polyester from Goodyear Tire and Rubber Company, Akron, Ohio |
| 2.9 | Binder Material - MONDUR ™ CB75, a 75 weight percent solids solution in ethyl acetate of an aromatic polyisocyanate based on adduct of toluene diisocyanate, from Miles, Inc., Pittsburgh, Pennsylvania |
| 10.0 | Compound - 5-amino-8-hydroxyquinoline solution in cyclohexanone (10% by weight 5-amino-8-hydroxyquinoline dissolved in cyclohexanone) |
| 0.2 | Catalyst - dibutyltin dilaurate |

This prebinder composition was made by first adding the compound to the VITEL™ 3550 polymer solution and mixing by hand. Next the MONDUR™ CB75 binder solution was added, followed by the catalyst.

When the prebinder composition was completely mixed, it was coated over the retroreflective elements to a wet thickness of about 200 micrometers (8 mils) using a notch bar coater and dried at about 66° C. (150° F.) for 5 minutes and then at 110° C. (230° F.) for another 5 minutes. An additional layer of the same composition was then applied on top of the first layer to a wet thickness of about 200 micrometers (8 mils) to act as an adhesive layer.

The resultant retroreflective article was then wet laminated to a polyester fabric (S-551-060 from Milliken & Company, Spartanburg, S.C.; a 3.11 ounce/yard² textile polyester). The construction was dried and cured at 66° C. (150° F.) for 5 minutes and then at 110° C. (230° F.) for 10 minutes. The construction was allowed to cure further for 2 weeks at ambient conditions before the polyethylene coated paper was removed to expose the glass beads, resulting in the retroreflective article.

Example 2

A retroreflective article was made following the procedures and using the starting materials of Example 1, except that 5 parts by weight of the 5-amino-8-hydroxyquinoline solution was used. The resultant retroreflective article was wet laminated to a polyester fabric as described in Example 1.

Testing

The articles of Examples 1 and 2 had initial retroreflective brightnesses in candelas per square meter per lux ("cpl") of 518 and 528, respectively, as tested by the above-described retroreflective brightness test.

The industrial launderability results obtained by laundering Examples 1 and 2 according to the foregoing Laundering procedure are tabulated in Table 1:

TABLE 1

| Percent Retroreflective Brightness Retained | | |
|---|---|---|
| Number of Laundry Cycles | Example 1 (%) | Example 2 (%) |
| 0 | 100.0 | 100.0 |
| 1 | 85.5 | 99.6 |
| 2 | 71.4 | 90.5 |
| 5 | 47.7 | 50.0 |
| 7 | 38.2 | 4.0 |

The data in Table 1 illustrate that retroreflective articles of the invention provide good retroreflective brightness retention after being laundered under industrial wash conditions.

Example 3

A monolayer of retroreflective elements was prepared as described in Example 1. A prebinder composition was formulated as follows.

| Amount (parts) | Component |
|---|---|
| 72.00 | Binder Material - 50 weight percent solids solution in methylethyl ketone/toluene (1:1 weight ratio) of VITEL ™ 3550, a linear hydroxy terminated aromatic polyester from Goodyear Tire and Rubber Company, Akron, Ohio |
| 2.60 | Cross-Linking Binder Material - MONDUR ™ CB75, a 75 weight percent solids solution in ethyl acetate of an aromatic polyisocyanate based on adduct of toluene diisocyanate, from Miles, Inc., Pittsburgh, Pennsylvania |
| 7.52 | Compound - catechol/formaldehyde novolak solution in methyl ethyl ketone (10% by weight catechol/formaldehyde novolak resin in methyl ethyl ketone) |

-continued

| Amount (parts) | Component |
|---|---|
| 0.14 | Catalyst - dibutyltin dilaurate |

This prebinder composition was coated over the retroreflective elements to a wet thickness of about 200 micrometers (8 mils) using a notch bar coater and dried at about 66° C. (150° F.) for 5 minutes and then at 110° C. (230° F.) for another 5 minutes. An additional layer of the same composition was then applied to a wet thickness of about 200 microns (8 mils) to act as an adhesive layer.

The resultant retroreflective article was then wet laminated to a polyester fabric like that used in Example 1. The retroreflective article then was dried and cured at 66° C. (150° F.) for 5 minutes and then at 110° C. (230° F.) for 10 minutes. The construction was allowed to cure further for 2 weeks at ambient conditions before the polyethylene coated paper was removed to expose the glass beads, resulting in the retroreflective article.

Example 4

A retroreflective article was made following the procedures and using the starting materials of Example 3 except that the prebinder composition was formulated as follows.

| Amount (parts) | Component |
|---|---|
| 100.0 | Binder Material - 50 weight percent solids solution in methylethyl ketone/toluene (1:1 weight ratio) of VITEL ™ 3550, a linear saturated polyester from Goodyear Tire and Rubber Company, Akron, Ohio |
| 3.0 | Binder Material - MONDUR ™ CB75, a 75 weight percent solids solution in ethyl acetate of an aromatic polyisocyanate based on adduct of toluene diiocyanate, from Miles, Inc., Pittsburgh, Pennsylvania |
| 5.4 | Compound - catechol/formaldehyde novolak solution in methyl ethyl ketone (10% by weight catechol/formaldehyde novolak resin in methyl ethyl ketone) |
| 0.2 | Catalyst - dibutyltin dilaurate |

Testing

The retroreflective articles of Examples 3 and 4 had initial retroreflective brightnesses in cpl of about 546 and 536, respectively, as tested by the above-described retroreflective brightness test.

The industrial launderability results obtained by laundering Examples 3 and 4 according to the foregoing Laundering Procedure are tabulated in Table 2.

TABLE 2

| Percent Retroreflective Brightness Retained | | |
|---|---|---|
| Laundry Cycles | Example 3 (%) | Example 4 (%) |
| 0 | 100.0 | 100.0 |
| 1 | 99.3 | 98.3 |
| 5 | 63.2 | 49.4 |
| 8 | 28.6 | 16.6 |

The data in Table 2 illustrate that the retroreflective articles of the invention provide good retroreflective brightness retention after being laundered.

Example 5

A monolayer of retroreflective elements was prepared as described in Example 1. A prebinder composition was formulated as follows.

| Amount (parts) | Component |
|---|---|
| 100.0 | Binder Material - 50 weight percent solids solution in methylethyl ketone/toluene (1:1 weight ratio) of VITEL™ 3550, a linear saturated polyester from Goodyear Tire and Rubber Company, Akron, Ohio |
| 2.9 | Binder Material - MONDUR™ CB75, a 75 weight percent solids solution in ethyl acetate of an aromatic polyisocyanate based on adduct of toluene diisocyanate, from Miles, Inc., Pittsburgh, Pennsylvania |
| 20.0 | Compound - 5-hydroxymethyl-8-hydroxyquinoline solution in cyclohexanone (5% by weight 5-hydroxymethyl-8-hydroxyquinoline dissolved in cyclohexanone) |
| 0.2 | Catalyst - dibutyltin dilaurate |

The prebinder composition was coated over the retroreflective elements to a wet thickness of about 200 micrometers (8 mils) using a notch bar coater and dried at about 66° C. (150° F.) for 5 minutes and then at 110° C. (230° F.) for another 5 minutes. An additional layer of the same composition was then applied to a wet thickness of about 200 micrometers (8 mils) to act as an adhesive layer.

The resultant retroreflective article was then wet laminated to a polyester fabric like that used in Example 1 and dried and cured at 66° C. (150° F.) for 5 minutes and then at 110° C. (230° F.) for 10 minutes. The construction was allowed to cure further for 2 weeks at ambient conditions before the polyethylene coated paper was removed to expose the glass beads, resulting in the retroreflective material.

Example 6

A retroreflective material was made following the procedures and using the starting materials of Example 5, except that 10 parts by weight of the 5-hydroxymethyl-8-hydroxyquinoline solution was used.

Testing

The articles of Example 5 and Example 6 had initial retroreflective brightnesses in candelas per square meter per lux ("cpl") of 567 and 545 respectively as tested according to the above-described retroreflective brightness test.

The industrial launderability results obtained by laundering Examples 5 and 6 and according to the foregoing Laundering Procedure are tabulated in Table 3.

TABLE 3

| | Percent Retroreflective Brightness Retained | |
|---|---|---|
| Laundry Cycles | Example 5 (%) | Example 6 (%) |
| 0 | 100.0 | 100.0 |
| 2 | 95.3 | 87.5 |
| 3 | 82.6 | 76.1 |
| 4 | 72.7 | 57.1 |
| 5 | 55.3 | 34.9 |
| 6 | 47.2 | 14.5 |
| 7 | 39.0 | 3.5 |
| 10 | 19.7 | 0.2 |

The data in Table 3 illustrate that the retroreflective articles of the invention provide good retroreflective brightness retention after being laundered.

Example 7

To make Example 7, a 3M Scotchlite™ 8910 reflective fabric from 3M Company, St. Paul, Minn. was wiped with a 10% solution of catechol/formaldehyde novolak dissolved in methyl ethyl ketone and allowed to dry at room temperature overnight.

Home Wash Test

Home washability of these Examples was evaluated by washing enough pieces of fabric as described in Example 1 above to have a 4 pound load including one piece of fabric to which the retroreflective fabrics from Example 7 have been applied. The pieces of fabric were washed for the indicated number of cycles in a Maytag washing machine using 40.0 grams of American Association of Textile Colorists and Chemists (AATCC) detergent and the following washer settings: "Regular" Action, Setting "10", Large load, "Regular" fabric, and hot wash (110° F., 43° C.), cold rinse water cycle. The retroreflective brightness of the middle of each sample was determined periodically. The results are expressed as the percentage of the initial retroreflective brightness retained after the indicated number of wash cycles.

The retroreflective material of Example 7 had initial retroreflective brightnesses in cpl of about 564. The home washability results obtained are tabulated in Table 4.

TABLE 4

| | Percent Retroreflective Brightness Retained |
|---|---|
| Washing Cycles | Example 7 (%) |
| 0 | 100.0 |
| 1 | 94.0 |
| 2 | 99.5 |
| 3 | 100.9 |
| 4 | 100.9 |
| 5 | 99.1 |
| 6 | 98.0 |
| 7 | 97.5 |
| 8 | 97.2 |
| 9 | 96.5 |
| 10 | 95.9 |
| 15 | 87.6 |
| 20 | 79.1 |
| 25 | 73.8 |
| 30 | 70.4 |
| 35 | 66.1 |
| 40 | 60.6 |
| 45 | 59.8 |
| 50 | 56.6 |

The data of Table 4 illustrate that the retroreflective article of the invention provide good retroreflective brightness retention after being laundered under home wash conditions.

This invention may take on various modifications and alterations without departing from the spirit and scope thereof. Accordingly, it is to be understood that this invention is not to be limited to the above-described, but is to be controlled by the limitations set forth in the following claims and any equivalents thereof. It is also to be understood that this invention may be suitably practiced in the absence of any dement not specifically disclosed herein.

We claim:

1. A retroreflective article comprising:
   a polymeric binder layer having first and second major surfaces;
   a monolayer of optical elements having portions at least partially embedded in the first major surface of the binder layer;
   a reflective metal disposed at least beneath the embedded portions of the optical elements; and
   a compound having at least a first constituent comprising an aromatic bidentate moiety, the compound being chemically associated with the reflective metal.

2. The retroreflective article of claim 1, wherein the compound is disposed proximate to the first major surface of the binder layer.

3. The retroreflective article of claim 2, wherein the reflective metal is specularly reflective and is disposed between the binder layer and the compound.

4. The retroreflective article of claim 3, wherein the compound is in the form of a coating.

5. The retroreflective article of claim 2, wherein the compound is between the binder layer and the reflective metal, and the compound is physically or chemically associated with the binder layer.

6. The retroreflective article of claim 5, wherein the compound is in the form of a coating lying directly on top of the binder layer.

7. The retroreflective article of claim 1, wherein the compound is combined with the binder layer at 0.1 to 10 weight percent, and the compound is physically or chemically associated with the binder layer.

8. The retroreflective article of claim 7, wherein the compound is concentrated at the first major surface of the binder layer.

9. The retroreflective article of claim 7, wherein the compound is dispersed throughout the binder layer.

10. The retroreflective article of claim 1, wherein the bidentate portion of the aromatic bidentate moiety is dihydroxy or hydroxyl and aromatic nitrogen.

11. The retroreflective article of claim 10 wherein the compound is selected from the group consisting of 8-hydroxyquinoline, 1,2-dihydroxy benzene, 1,8-dihydroxynaphthalene, substituted forms thereof and forms thereof which incorporate the aromatic nucleus into a larger formula.

12. The retroreflective article of claim 1, wherein the compound has a second constituent that is at least physically associated with the binder layer.

13. The retroreflective article of claim 12, wherein the second constituent is a $C_5$ to $C_{20}$ aliphatic group or a $C_6$ to $C_{20}$ aromatic group providing physical association between the compound and binder layer or is a group providing chemical association between the compound and the binder layer.

14. The retroreflective article of claim 12 wherein the second constituent provides a covalent bond between the compound and the polymer and is a $C_1$ to $C_8$ alkylene or $C_6$ to $C_{20}$ aromatic ring substituted by an amine, hydroxy, isocyanato, epoxy, carboxy, vinyl, mercapto or activated acyl group.

15. The retroreflective article of claim 13 wherein the second constituent provides a covalent bond between the compound and the polymer and is an amine, hydroxy, isocyanato, epoxy, carboxy, vinyl, mercapto or activated acyl group.

16. The retroreflective article of claim 13, wherein the compound includes 5-amino-8-hydroxyquinoline.

17. The retroreflective article of claim 13 wherein the compound is selected from the groups consisting of 8-hydroxyquinoline having the second constituent, 1,2-dihydroxy benzene having the second constituent, 1,8-dihydroxy naphthalene having the second constituent, substituted forms thereof, forms thereof which incorporate the aromatic nucleus into a larger formula, and a catechol-formaldehyde novolak resin.

18. The retroreflective article of claim 1, wherein the polymeric binder layer comprises a polymeric substance that is an elastomer.

19. The retroreflective article of claim 18, wherein the polymeric binder layer includes a polymer that is a cross-linked or virtually cross-linked elastomer.

20. The retroreflective article of claim 18, wherein the polymeric binder layer is from 50 to 200 micrometers thick.

21. The retroreflective article of claim 1, wherein the optical elements are microspheres and the reflective metal contains elemental aluminum, and wherein the aluminum is in the form of flakes or a continuous coating.

22. The retroreflective article of claim 1, further comprising a substrate attached to the second surface of the binder layer.

* * * * *

UNITED STATES PATENT AND TRADEMARK OFFICE
CERTIFICATE OF CORRECTION

PATENT NO.: 5,474,827

DATED: December 12, 1995

INVENTOR(S): Michael D. Crandall et al.

It is certified that error appears in the above-identified patent and that said Letters Patent is hereby corrected as shown below:

Col. 1, line 46, delete the first occurrence of "an" and insert --art--.

Col. 5, line 21, "$1.0=X10^{-3}$" should be --$1.0X10^{-3}$--.

Col. 10, line 12, "carded" should be --carried--.

Col. 17, line 11, "dement" should be --element--.

Signed and Sealed this

Twenty-sixth Day of March, 1996

BRUCE LEHMAN

Attest:

Attesting Officer

Commissioner of Patents and Trademarks